(12) United States Patent
Mizushima et al.

(10) Patent No.: US 11,584,037 B2
(45) Date of Patent: Feb. 21, 2023

(54) WIRE SAW APPARATUS AND METHOD FOR MANUFACTURING WAFER

(71) Applicant: SHIN-ETSU HANDOTAI CO., LTD., Tokyo (JP)

(72) Inventors: Kazutoshi Mizushima, Nishigo-mura (JP); Toshiaki Otaka, Nishigo-mura (JP); Tatsuo Enomoto, Setagaya-ku (JP); Yuichi Shimizu, Nishigo-mura (JP)

(73) Assignee: SHIN-ETSU HANDOTAI CO., LTD., Tokyo (JP)

( * ) Notice: Subject to any disclaimer, the term of this patent is extended or adjusted under 35 U.S.C. 154(b) by 238 days.

(21) Appl. No.: 16/957,787

(22) PCT Filed: Nov. 1, 2018

(86) PCT No.: PCT/JP2018/040633
§ 371 (c)(1),
(2) Date: Jun. 25, 2020

(87) PCT Pub. No.: WO2019/130806
PCT Pub. Date: Jul. 4, 2019

(65) Prior Publication Data
US 2021/0362373 A1    Nov. 25, 2021

(30) Foreign Application Priority Data

Dec. 25, 2017   (JP) .............................. JP2017-247854

(51) Int. Cl.
*B28D 5/04*     (2006.01)
*B24B 27/06*    (2006.01)
(52) U.S. Cl.
CPC .......... *B28D 5/045* (2013.01); *B24B 27/0633* (2013.01)

(58) Field of Classification Search
CPC ............................ B28D 5/045; B24B 27/0633
See application file for complete search history.

(56) References Cited

U.S. PATENT DOCUMENTS

2002/0174861 A1* 11/2002 Lundt .................. B28D 5/0064
125/21
2013/0139800 A1   6/2013 Zavattari et al.
(Continued)

FOREIGN PATENT DOCUMENTS

JP    H07-001442 A    1/1995
JP    H09-192940 A    7/1997
(Continued)

OTHER PUBLICATIONS

Jun. 23, 2020 Office Action issued in Japanese Patent Application No. 2017-247854.
(Continued)

*Primary Examiner* — Omar Flores Sanchez
(74) *Attorney, Agent, or Firm* — Oliff PLC

(57) ABSTRACT

A wire saw apparatus including: a plurality of wire guides; a wire row formed of a wire which is wound around the plurality of wire guides and configured to reciprocatively travel in an axial direction; a nozzle configured to supply a coolant or slurry to the wire; a workpiece-holding portion configured to suspend and hold a workpiece plate having a workpiece bonded thereto with a beam interposed therebetween; a workpiece-feeding mechanism configured to press the workpiece against the wire row; and a mechanism configured to adjust a parallelism of axes of the plurality of wire guides around which the wire row is formed. Thereby, a wire saw apparatus and a method for manufacturing a wafer are provided which enable manufacturing of a wafer having any warp shape by controlling a warp in a wire travelling direction of a sliced workpiece.

2 Claims, 4 Drawing Sheets

(56) References Cited

U.S. PATENT DOCUMENTS

| | | | |
|---|---|---|---|
| 2013/0139801 A1 | 6/2013 | Zavattari et al. | |
| 2013/0144420 A1 | 6/2013 | Zavattari et al. | |
| 2013/0144421 A1 | 6/2013 | Zavattari et al. | |
| 2022/0024073 A1* | 1/2022 | Lin | B28D 5/045 |
| 2022/0040882 A1* | 2/2022 | Beyer | B24B 27/0633 |
| 2022/0134600 A1* | 5/2022 | Zheng | B28D 7/02 |
| | | | 125/21 |

FOREIGN PATENT DOCUMENTS

| | | |
|---|---|---|
| JP | 2000-108012 A | 4/2000 |
| JP | 2003-001624 A | 1/2003 |
| JP | 2009-029078 A | 2/2009 |
| JP | 2010-110866 A | 5/2010 |
| JP | 2014-133272 A | 7/2014 |
| JP | 2016-135529 A | 7/2016 |
| TW | 201335982 A | 9/2013 |
| WO | 2015126003 A1 | 8/2015 |

OTHER PUBLICATIONS

Jun. 30, 2020 International Preliminary Reporton Patentability issued in International Patent Application No. PCT/JP2018/040633.
Jan. 15, 2019 International Search Report issued in International Patent Application No. PCT/JP2018/040633.
May 13, 2022 Office Action issued in Taiwanese Patent Application No. 107139749 (with partial translation).
Oct. 25, 2022 Office Action issued in Taiwanese Patent Application No. 107139749.
Nov. 28, 2022 Office Action issued in Korean Patent Application No. 2020-7018338.

* cited by examiner

[FIG. 1]
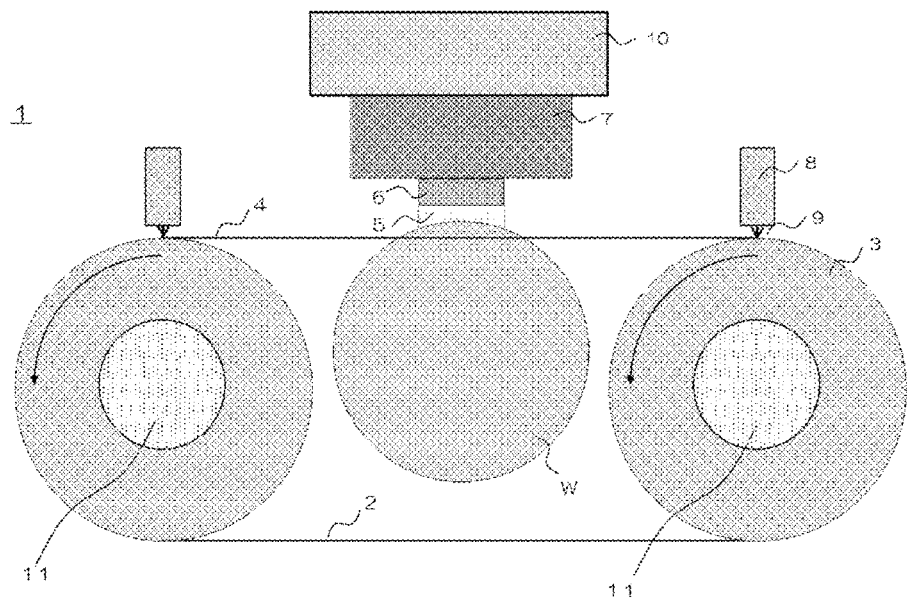
[FIG. 2]
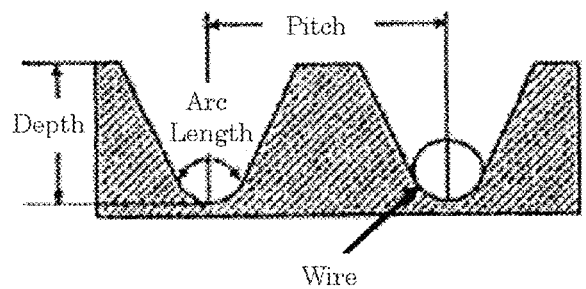
[FIG. 3]
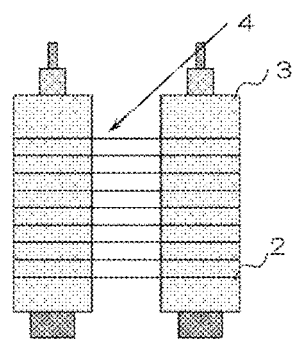
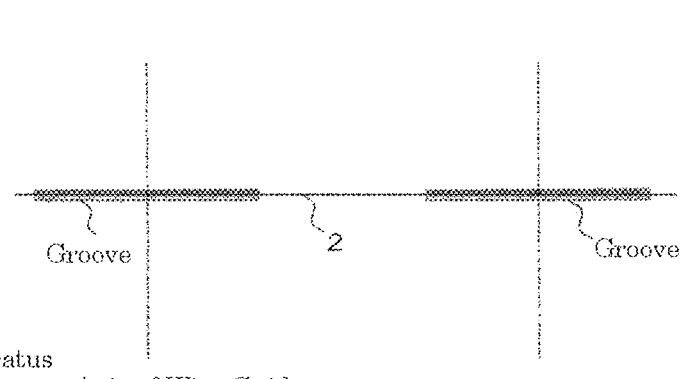

[FIG. 4]
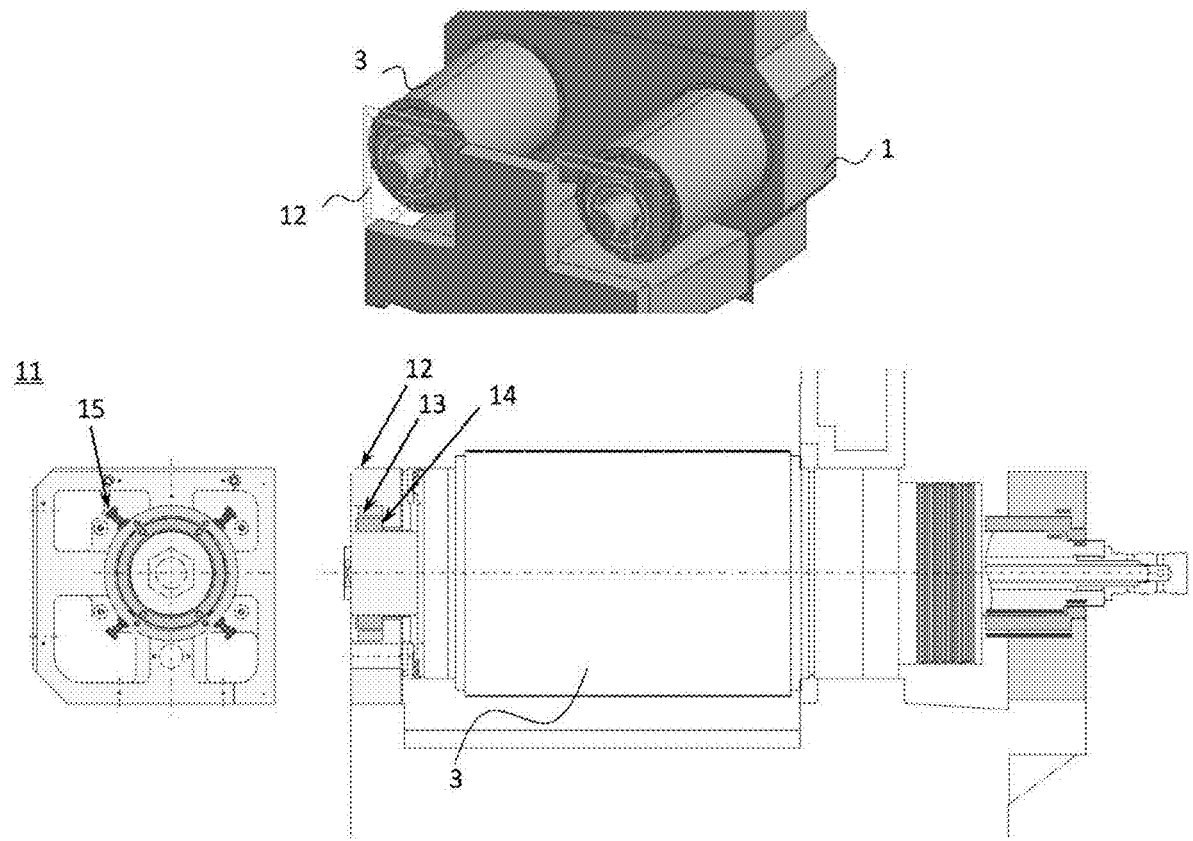
[FIG. 5]
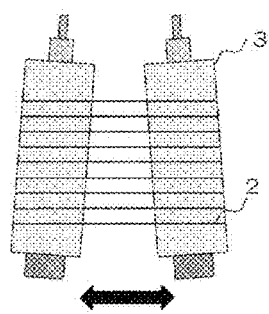
Front Side of Wire Saw Apparatus
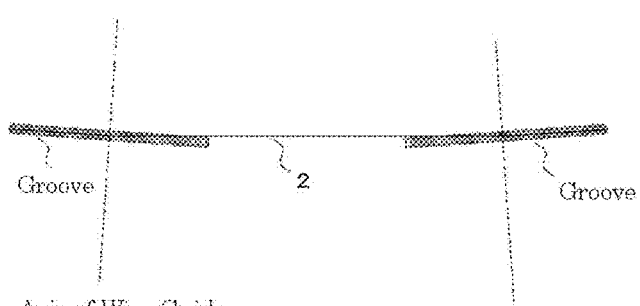
Front Side of Wire Saw Apparatus

[FIG. 6]
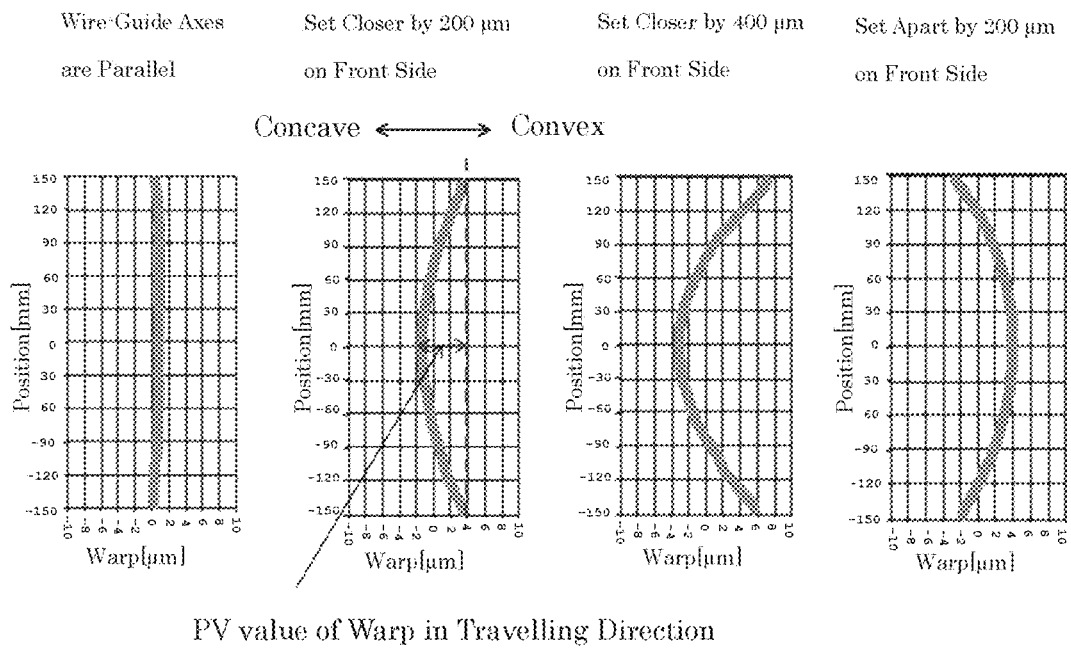
[FIG. 7]
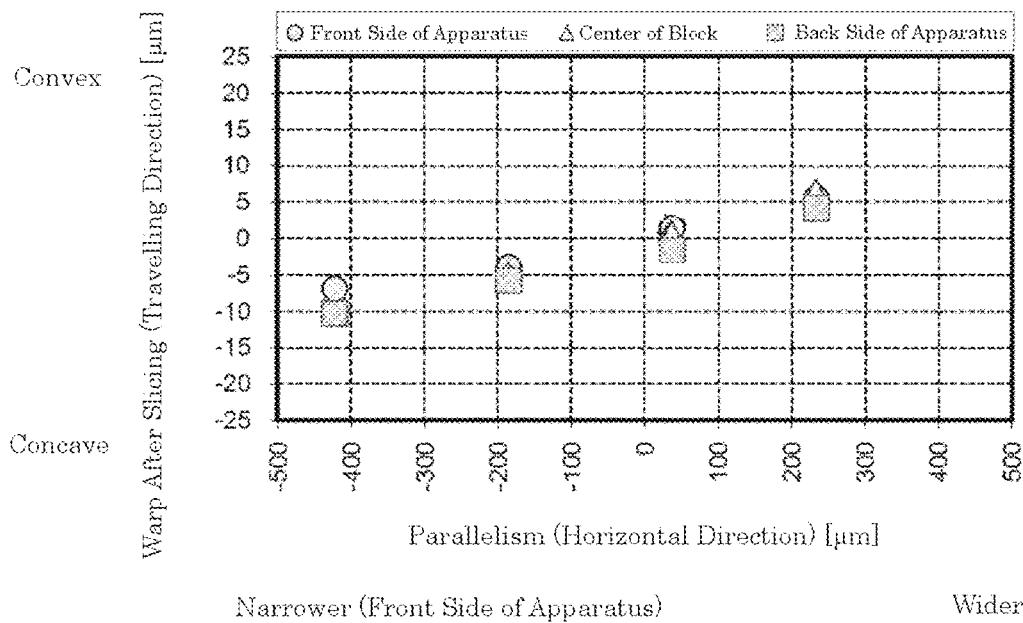

[FIG. 8]
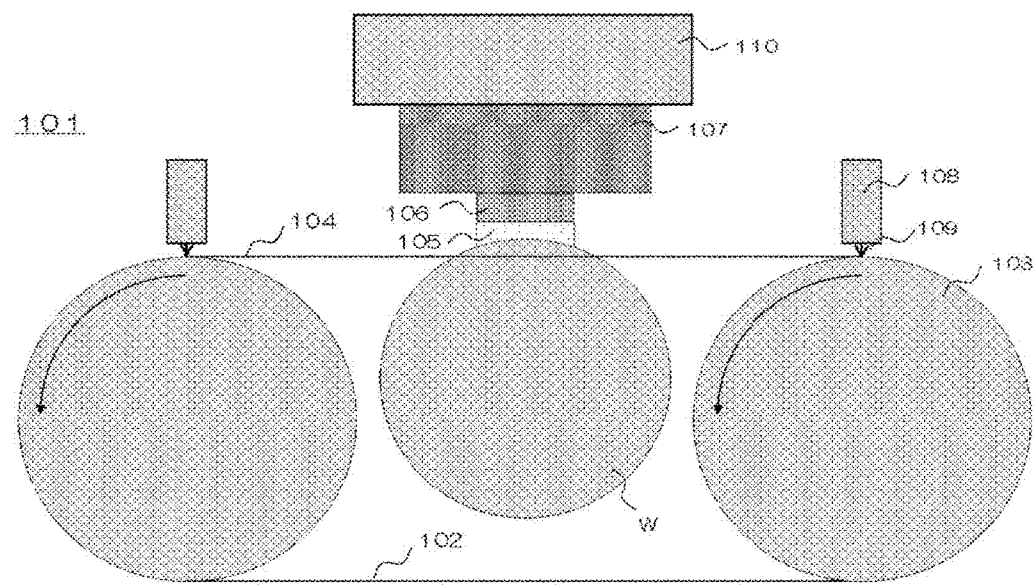
[FIG. 9]
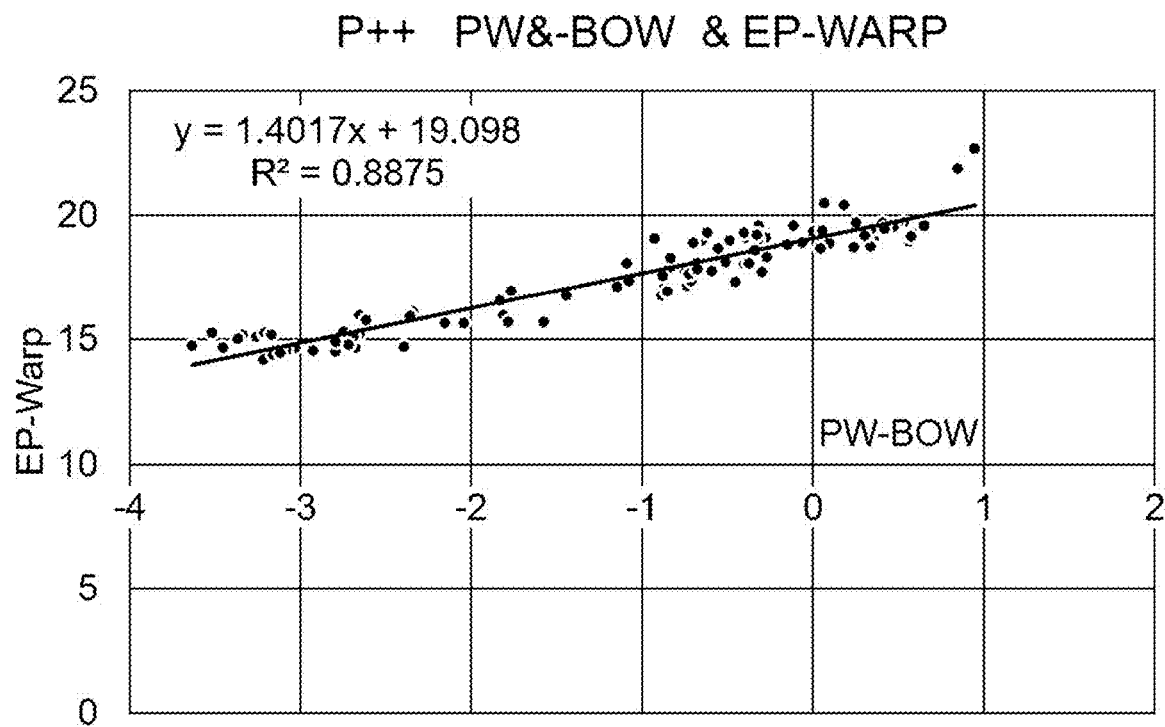

WIRE SAW APPARATUS AND METHOD FOR MANUFACTURING WAFER

TECHNICAL FIELD

The present invention relates to a wire saw apparatus and a method for manufacturing a wafer.

BACKGROUND ART

Semiconductor wafers such as silicon wafers are sliced off from a workpiece such as silicon ingot by using a cutting apparatus such as a wire saw apparatus 101 as shown in FIG. 8. Typically, the wire saw apparatus 101 includes a wire row 104 that is formed by winding a wire 102 around multiple wire guides 103, and the wire 102 reciprocatively travels in an axial direction. Further, the wire saw apparatus 101 includes: a nozzle 108 configured to supply a slurry 109 to the wire 102; a workpiece-holding portion 107 configured to suspend and hold a workpiece plate 106 having a workpiece W bonded thereto with a beam 105 interposed between the workpiece plate 106 and the workpiece W; and a workpiece-feeding mechanism 110 configured to push relatively down and press the workpiece W against the wire row 104. Such wire saw apparatus 101 can slice the workpiece W into wafers by pressing the workpiece W against the wire row 104.

Meanwhile, slicing with a wire saw causes sliced workpieces to warp. This warpage caused by slicing with a wire saw is determined by the change over time in relative positions between the workpiece (ingot) and the wire during cutting. It is generally believed that warp is formed in a slicing direction by the influences of: thermal deformation of an apparatus casing and thermal expansion of main rollers, around which a wire is wound, and an ingot during cutting that is from the beginning to the end of slicing. Hence, it has been disclosed that such warp in the slicing direction can be improved by controlling the temperatures of slurry and cooling water for main roller spindles (Patent Documents 1 to 3).

CITATION LIST

Patent Literature

Patent Document 1: Japanese Unexamined Patent Application Publication No. Hei 7-1442
Patent Document 2: Japanese Unexamined Patent Application Publication No. 2009-29078
Patent Document 3: Japanese Unexamined Patent Application Publication No. 2016-135529

SUMMARY OF INVENTION

Technical Problem

In cutting-edge devices, epitaxial wafers having undergone epitaxial growth are used as low-resistivity base wafers. Nevertheless, due to a difference in resistivity between a base wafer and an epitaxial layer, the wafer is changed to have a convex shape after the epitaxial growth, and the warp is degraded. As shown in FIG. 9, the Bow value of base wafers correlates with warp after epitaxy, and there is such a tendency that improvements in warp after epitaxy are observed from wafers whose Bow is minus. Accordingly, if warps in a slicing direction and a travelling direction can be controlled and directed in concave directions during slicing with a wire saw, the warps after epitaxy are improved. However, Patent Documents 1 to 3 relate to the control of warp in the slicing direction from the start to the end of slicing, and no method for controlling warp in a wire travelling direction has been established yet.

The present invention has been made in view of the above-described problems. An object of the present invention is to provide a wire saw apparatus and a method for manufacturing a wafer which make it possible to manufacture a wafer having any warp shape by controlling a warp in a wire travelling direction of a workpiece sliced with the wire saw apparatus.

Solution to Problem

To achieve the object, the present invention provides a wire saw apparatus comprising:
a plurality of wire guides;
a wire row formed of a wire which is wound around the plurality of wire guides and configured to reciprocatively travel in an axial direction;
a nozzle configured to supply a coolant or slurry to the wire;
a workpiece-holding portion configured to suspend and hold a workpiece plate having a workpiece bonded thereto with a beam interposed therebetween;
a workpiece-feeding mechanism configured to press the workpiece against the wire row; and
a mechanism configured to adjust a parallelism of axes of the plurality of wire guides around which the wire row is formed.

Such a wire saw apparatus makes it possible to manufacture a wafer having any warp shape by controlling a warp of the sliced workpiece in a wire travelling direction.

Moreover, the present invention provides a method for manufacturing a wafer by using the above-described wire saw apparatus, comprising:
adjusting a parallelism of the axes of the plurality of wire guides around which the wire row is formed, before a workpiece is sliced, to control a warp in a wire travelling direction of the sliced workpiece.

In this manner, the inventive wire saw apparatus is suitably usable in the wafer manufacturing method in which the concave/convex warp in the wire travelling direction of the sliced workpiece is controlled.

Further, the present invention provides a method for manufacturing a wafer, comprising:
forming a wire row by winding a wire around a plurality of wire guides, wherein the wire is configured to reciprocatively travel in an axial direction; and
causing a workpiece-feeding mechanism to press a workpiece held by a workpiece-holding portion against the wire row to slice the workpiece, while supplying a coolant or slurry from a nozzle to the wire, wherein
a parallelism of axes of the plurality of wire guides around which the wire row is formed is adjusted, before the workpiece is sliced, to control a warp in a wire travelling direction of the sliced workpiece.

Such a method for manufacturing a wafer makes it possible to control the warp of the sliced workpiece in the wire travelling direction and manufacture a wafer having any warp shape.

Advantageous Effects of Invention

As described above, the wire saw apparatus and the method for manufacturing a wafer according to the present invention enable warp control in the wire travelling direction and manufacturing of wafers having any warp shapes.

BRIEF DESCRIPTION OF DRAWINGS

FIG. 1 is a schematic drawing showing an example of a wire saw apparatus according to the present invention.

FIG. 2 is a schematic drawing showing an example of grooves formed in the surface of a wire guide in the inventive wire saw apparatus.

FIG. 3 shows schematic drawings illustrating top portions of a wire and grooves in the surfaces of multiple wire guides of the inventive wire saw apparatus when axes of the wire guides are parallel to each other.

FIG. 4 shows schematic drawings illustrating an example of a mechanism for adjusting the axes of the multiple wire guides of the inventive wire saw apparatus.

FIG. 5 shows schematic drawings illustrating top portions of the wire and the grooves in the surfaces of the multiple wire guides of the inventive wire saw apparatus when a parallelism of the axes of the wire guides is adjusted.

FIG. 6 shows graphs for illustrating warp shapes in a wire travelling direction of sliced workpieces when parallelisms of axes of multiple wire guides were adjusted in Examples.

FIG. 7 is a graph for illustrating a correlation between the adjustment amount of the parallelism of the axes of the multiple wire guides and the PV value of the warps in the wire travelling direction.

FIG. 8 is a schematic drawing showing an example of a conventional wire saw apparatus.

FIG. 9 is a graph for illustrating a correlation between the Bow value of base wafers and the warp after epitaxy.

DESCRIPTION OF EMBODIMENTS

As described above, heretofore, no method has been established for controlling warp in a wire travelling direction of a sliced workpiece with a wire saw apparatus.

The present inventors have earnestly studied the above-described problems and consequently found that by adjusting the parallelism of axes of wire guides, a wire can be bent in a front-back direction of a wire saw apparatus while a workpiece is being sliced. Moreover, the inventors have found that a warp of the sliced workpiece in a wire travelling direction can be controlled thereby. These findings have led to the completion of the present invention.

Hereinafter, a wire saw apparatus and a method for manufacturing a wafer of the present invention will be described in detail with reference to the drawings, but the present invention is not limited thereto. Note that, in the present application, "parallelism (parallelism adjustment amount)" means inclination amounts of axes in a horizontal direction. Now, the inclination amounts will be described in more detail using FIGS. 3 and 5. The inclination amounts refer to a degree of opening between axes of multiple wire guides 3 as shown on the left side of FIG. 5 which are inclined in the horizontal direction from positions where the axes of the multiple wire guides 3 are parallel to each other as shown on the left side of FIG. 3.

As shown in FIG. 1, a wire saw apparatus 1 according to the present invention includes: multiple wire guides 3; a wire row 4 formed of a wire 2 which is wound around the multiple wire guides 3 and configured to reciprocatively travel in a wire axial direction; and a nozzle 8 configured to supply a coolant or slurry 9 to the wire 2. As the slurry 9, a slurry containing loose abrasive grains of silicon carbide or the like can be used.

Moreover, the inventive wire saw apparatus 1 includes a workpiece-holding portion 7 configured to suspend and hold a workpiece plate 6 having a workpiece W bonded thereto with a beam 5 interposed between the workpiece plate 6 and the workpiece W; and a workpiece-feeding mechanism 10 configured to push relatively down and press the workpiece W against the wire row 4. Specifically, the workpiece W is bonded to the workpiece plate 6 via the beam 5 using an epoxy adhesive or the like, and the workpiece plate 6 is held by the workpiece-holding portion 7, so that the workpiece W is held by the workpiece-holding portion 7. After slicing is initiated, the workpiece W is fed for slicing to the wire row 4 and sliced.

As shown in FIG. 2, the surfaces of the wire guides 3 of the wire saw apparatus 1 have a large number of grooves for winding the wire 2. By winding the wire 2 around the right and left wire guides 3 in parallel, the parallel wire row 4 is formed. In the present invention, the pitch, depth, and so forth of the grooves are not particularly limited, and can be set appropriately.

As shown in the top view of the wire guides in FIG. 3, the wire 2 is normally stretched in parallel in the grooves on the surfaces of the right and left wire guides 3. Since a warp in a wire travelling direction of a sliced workpiece is determined by relative positions between the workpiece W and the wire row 4 formed by the wire guides 3, when the wire row 4 is parallel to the wire travelling direction, the warp in the wire travelling direction of the sliced workpiece is straight. To control the warp in the travelling direction, it is necessary to bend the wire in a front-back direction of the wire saw apparatus by changing the relative positions of the wire row 4 to the workpiece W, that is, adjusting a parallelism of axes of the wire guides.

The inventive wire saw apparatus 1 further includes a mechanism configured to adjust a parallelism of the axes of the multiple wire guides 3 forming the wire row (hereinafter referred to as parallelism-adjusting mechanism) to be described below.

FIG. 4 shows schematic drawings illustrating an example of the parallelism-adjusting mechanism 11 in the inventive wire saw apparatus. The wire guide 3 is held by a front block 12 at a front surface portion of the wire saw apparatus 1. An outer ring 13 and an inner ring 14 are respectively fixed to the front block 12 and the wire guide 3. The inventive wire saw apparatus is capable of adjusting right and left spindle shafts (the axes of the wire guides), and, a parallelism of the axes of the wire guides at desired by using adjustment bolts 15. This makes it possible to control the warp in the wire travelling direction of the sliced workpiece and manufacture a wafer having any warp shape.

Note that, as the axis adjustment range, each of the right and left spindle shafts is preferably adjusted within a range of ±2 mm. With this range, the parallelism of the spindle shafts can be adjusted without structural limitation of the wire saw apparatus.

FIG. 5 shows schematic drawings illustrating top portions of the wire 2 and the grooves of the wire guides 3 when the wire guides 3 are set apart on the front side of the wire saw apparatus (i.e., when the parallelism of the axes of the wire guides 3 is increased). As shown in FIG. 5, the wire 2 is parallel to the grooves of the wire guides 3 until the wire 2 reaches central portions of the grooves; meanwhile, on inner sides of the grooves, the wire 2 is deformed as if the wire 2 is pushed up toward the back of the wire saw apparatus. The warp in the wire travelling direction of the sliced workpiece is shaped in a convex direction by the wire 2 deformed toward the back of the wire saw apparatus.

On the other hand, when the wire guides 3 are set closer on the front side of the wire saw apparatus (i.e., when a parallelism of the axes of the wire guides 3 on the opposite side is increased), the wire 2 is deformed as if the wire 2 is pushed down toward the front of the apparatus. Thus, the warp in the wire travelling direction of the sliced workpiece is shaped in a concave direction.

Further, the present invention provides a method for manufacturing a wafer. This method can be performed using the wire saw apparatus 1 as described above. Specifically, the inventive method for manufacturing a wafer includes:

forming the wire row 4 by winding the wire 2 around the multiple wire guides 3, the wire 2 being configured to reciprocatively travel in the axial direction; and causing the workpiece-feeding mechanism 10 to press the workpiece W held by the workpiece-holding portion 7 against the wire row to slice the workpiece, while supplying a coolant or slurry from the nozzle 8 to the wire 2. In this wafer manufacturing method, a parallelism of the axes of the multiple wire guides 3 around which the wire row 4 is formed is adjusted, before the workpiece W is sliced, to control the warp in the wire travelling direction of the sliced workpiece.

As described above, according to the present invention, a parallelism of the axes of the wire guides 3 is adjusted. This makes it possible to control the warp in the wire travelling direction and manufacture wafers having any warp shapes.

EXAMPLE

Hereinafter, the present invention will be specifically described with reference to Examples, but the present invention is not limited thereto.

The wire saw apparatus 1 including the parallelism-adjusting mechanism 11 as shown in FIG. 1 and FIG. 4 was used to slice silicon ingots (workpieces) each having a diameter of 300 mm, after the parallelism of the axes of the wire guides was adjusted from −400 μm to 200 μm. The shapes of the warps in the wire travelling direction of the sliced workpieces were compared. FIG. 6 shows the result.

As shown in FIG. 6, it was demonstrated that when the axes of the wire guides were set closer by 200 μm and 400 μm on the front side of the wire saw apparatus, the warps in the wire travelling direction of the sliced workpieces were changed into concave shapes. Meanwhile, when the axes were set apart by 200 μm, the warp in the travelling direction of the sliced workpiece was changed into a convex shape.

FIG. 7 illustrates a correlation between the parallelism adjustment amount of the axes of the wire guides and the PV value (Peak to Valley) of the warps in the travelling direction shown in FIG. 6. As the warp data, data on three wafers from each ingot were used, which were located at the back side of the apparatus, the center of the block, and the front side of the apparatus. As shown in FIG. 7, a correlation was found between the parallelism adjustment amount of the axes of the wire guides 3 and the concave/convex amount of the warps in the wire travelling direction. When the gap between the wire guides 3 was set narrower on the front side of the apparatus, the warp in the wire travelling direction was changed in the concave direction; meanwhile, when the gap was set wider, the warp was changed in the convex direction. From the above, it was revealed that adjusting the parallelism of the axes of the wire guides 3 makes it possible to control the concave/convex amount of the warp in the wire travelling direction.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:

1. A wire saw apparatus comprising:
   a plurality of wire guides;
   a wire row formed of a wire which is wound around the plurality of wire guides and configured to reciprocatively travel in an axial direction;
   a nozzle configured to supply a coolant or slurry to the wire;
   a workpiece-holding portion configured to suspend and hold a workpiece plate having a workpiece bonded thereto with a beam interposed therebetween;
   a workpiece-feeding mechanism configured to press the workpiece against the wire row; and
   a mechanism configured to adjust a parallelism of axes of the plurality of wire guides around which the wire row is formed, wherein a warp in a wire travelling direction of the sliced workpiece is controllable.

2. A method for manufacturing a wafer, comprising:
   forming a wire row by winding a wire around a plurality of wire guides, wherein the wire is configured to reciprocatively travel in an axial direction; and
   causing a workpiece-feeding mechanism to press a workpiece held by a workpiece-holding portion against the wire row to slice the workpiece, while supplying a coolant or slurry from a nozzle to the wire, wherein
   a parallelism of axes of the plurality of wire guides around which the wire row is formed is adjusted, before the workpiece is sliced, to control a warp in a wire travelling direction of the sliced workpiece.

* * * * *